United States Patent [19]
Widmer et al.

[11] 3,743,416
[45] July 3, 1973

[54] OPTICAL IMAGE FOCUSING DEVICE WITH AUDIBLE INDICATION

[75] Inventors: J. Arthur Widmer, Hollywood; Richard J. Stumpf, Woodland Hills, both of Calif.

[73] Assignee: MCA, Inc., Universal City, Calif.

[22] Filed: Aug. 30, 1971

[21] Appl. No.: 175,925

[52] U.S. Cl. .................... 355/56, 95/44 R, 352/140, 355/68
[51] Int. Cl. .......................................... G03b 27/34
[58] Field of Search .......................... 350/41, 46, 47; 352/140; 355/56, 61, 62, 63, 68; 95/44 R

[56] References Cited

UNITED STATES PATENTS

| | | | |
|---|---|---|---|
| 3,364,815 | 1/1968 | Smith et al. | 352/140 X |
| 3,544,214 | 12/1970 | Edgar | 355/68 |
| 3,532,045 | 10/1970 | Genähr | 355/56 X |
| 3,625,609 | 12/1971 | Clapp | 355/68 X |

OTHER PUBLICATIONS

IBM Technical Disclosure, Bederman Camera Focusing System, 12–1966.

*Primary Examiner*—Samuel S. Matthews
*Assistant Examiner*—E. M. Bero
*Attorney*—Fulwider, Patton, Rieber, Lee & Utecht

[57] ABSTRACT

An electronic device for indicating the degree of focus of an optically formed image via an audible tone. An optical image, of unknown degree of focus, is directed upon a photoconductive semiconductor cell. The cell's electrical conductance is a function of the degree of focus of the optical image which is formed on its surface. An audio tone is generated having a frequency dependent upon the cell's conductance, providing an audible indication of the degree of focus of the image. The focal plane of the optical image is adjusted until the audible tone frequency reaches a maximum or minimum value, indicating that the image is sharply focused on the surface of the photoconductive cell.

11 Claims, 3 Drawing Figures

INVENTORS
J. ARTHUR WIDMER
RICHARD J. STUMPF
BY Fulwider, Patton, Rieber Lee, and Utecht
ATTORNEYS INVENTORS
J. ARTHUR WIDMER
BY RICHARD J. STUMPF
Fulwider, Patton, Rieber, Lee, and Utecht
ATTORNEYS

OPTICAL IMAGE FOCUSING DEVICE WITH AUDIBLE INDICATION

BACKGROUND OF THE INVENTION

This invention relates to electrical circuits containing photoconductive devices and, more particularly, to photoconductor circuits for aiding in focusing optically formed images on any desired surface. Specifically, this invention includes an electronic circuit utilizing a photoconductive semiconductor cell as a sensing element for aiding the focusing of an optically formed image.

It has been known in the art for years that photosensitive devices, such as photo cells, develop electrical output changes as functions of incident light. After photosensitive semiconductor cells were developed, it was further observed that the electrical conductance of certain of the cells varied as the distribution of incident light across the cell changed even if the total amount of light was held constant. The conductance of such cells was found to be at a minimum when the light distribution was most non-uniform, that is, when the images formed on the surfaces of the cells were in sharpest focus. It was then recognized that such cells could be utilized as indicators of the degree of focus of optically formed images.

This effect was utilized in the prior art in automatic focusing systems and focus indicating devices. In the former, the cell's conductance changes are electrically sensed and generally used to operate mechanical or electrical focus adjusting devices.

In the focus indicating devices, the changing electrical conductance of the photoconductive cell is used to obtain a proportionally changing voltage. This voltage is, in turn, applied to a voltmeter to obtain a visual indication of the degree of image focus.

Unfortunately, however, as with all indicating meters, the prior art voltmeters exhibit a time lag when changing indications. Not only does the meter time lag tend to slow the focusing process, it introduces a chance of error. Since the meter needle requires a finite time to steady following a change, it is difficult to accurately adjust the focus indicating devices near the peak reading of the meters.

Further, the indicating meter is impractical for use in darkrooms. Even in red or subdued light, the meter is difficult for the user to read.

Moreover, it has been found that small changes in cell conductance, though of great importance to focal quality, are difficult to discern with a meter. This problem is, of course, increased by the subdued light in which the indicator must often be viewed.

Finally, because the user of a focus indicating device may wish to view the image as it is being focused, an indicating meter makes it necessary for the user's attention to be constantly divided between the image and the meter itself. This is, of course, awkward for the user and results in a slowing of the focusing process.

Thus, there are devices in the prior art which utilize photoconductive cells to aid in focusing optical images to maximum sharpness. Each of the known devices, however, uses indicating meters and is believed inadequate for the reasons stated.

SUMMARY OF THE INVENTION

In accordance with the present invention, provision is made for an audible indication of the degree of focus of an optically formed image by an electronic circuit incorporating a photoconductive cell. The image is directed upon the surface of the cell which undergoes a change in conductance in accordance with the extent to which the image is properly focused. A voltage level dependent upon cell conductance is utilized to drive a voltage controlled, variable frequency tone generator. The tone generator output, which is in the audio range, is amplified and supplied to a speaker. As the user adjusts the position of the focal plane in relation to the surface of the photoconductive cell, the frequency of the output tone changes. The user continues to adjust the position of the focal plane until the audible tone frequency reaches a maximum or minimum value, depending upon a prior selection. When that value is reached, the image has been focused to maximum sharpness on the surface of the photoconductive cell. Unlike the prior art devices, which utilize meters, there is no time lag between adjustment and audible tone change. Not only does this speed the focusing process, it also removes a possible source of error.

Since the indicator output is audible, this invention may be used in subdued darkroom lighting or even in total darkness. Unlike prior art indicators, it is not necessary that a user of this invention actually see the device in order to use it as an aid in focusing an optical image.

Further, since the indication of degree of focus of this invention is audible, the user may give his full attention to the image which he is focusing. It is not necessary that he divide his attention between the image and the indicator as is the case with devices utilizing meters.

Finally, it has been found that the human ear is highly adept at discerning very small changes in tone frequency. Small changes in focal plane position, which change the output tone frequency by small amounts, are easily and immediately detected. Since small changes in a meter reading are difficult to detect, a greater accuracy in focusing images may be attained by use of this invention.

DESCRIPTION OF THE PREFERRED EMBODIMENT

Figure 1:
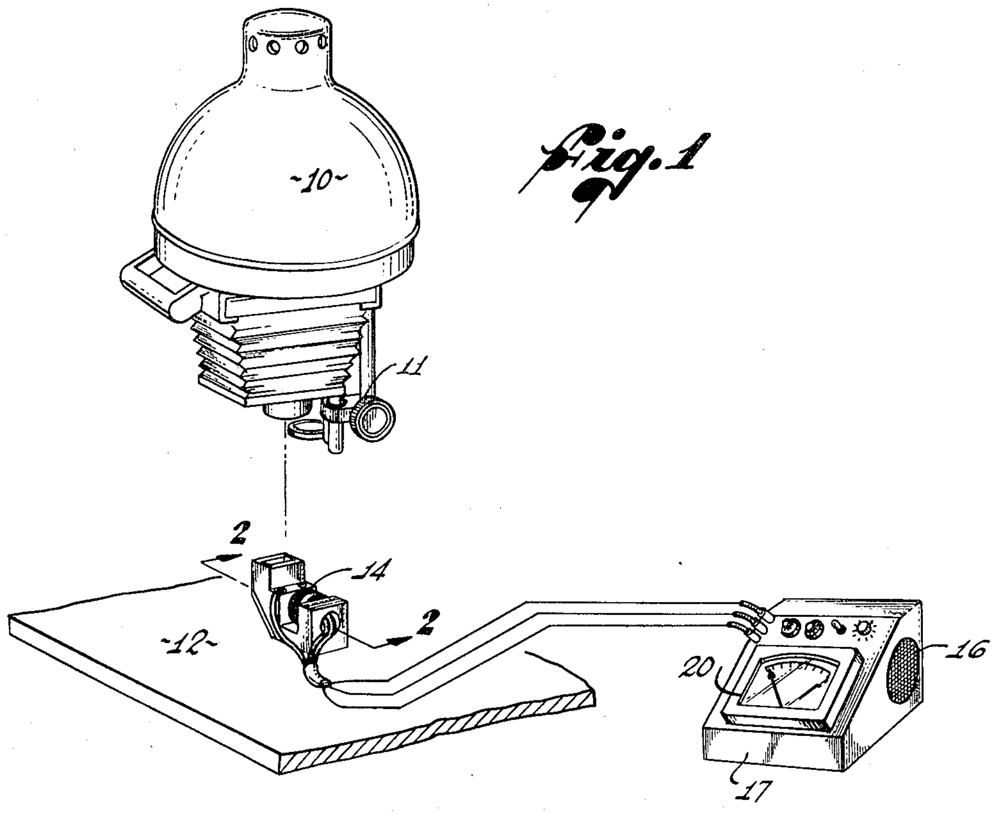
FIG. 1 is a fragmentary perspective view illustrating the use of this invention with a photographic enlarger, and comprising an image surface, a probe and indicating device according to the invention.

As shown in the drawings for purpose of illustration, the invention is illustrated in association with a standard photographic enlarger. The enlarger 10 causes an enlarged image to be formed on an image surface 12. In order to focus the image falling on the surface 12, a focusing knob 11 on the enlarger is adjusted by the user until the image focal plane lies on the surface.

A probe 14, which contains a photoconductive cell 26, is placed on the image surface 12. The probe is so constructed that the photoconductive cell surface is the same distance from the enlarger 10 as is the image surface 12.

The photoconductive cell contained within the probe in accordance with this invention is formed of a semiconductor material, such as cadmium sulfide, cadmium selenide or cadmium telluride. The electrical conductance of the photoconductive cell changes as an optical image directed upon the surface of the cell changes from an out-of-focus to an in-focus condition. This is believed caused by the fact that an in-focus image consists of sharply delineated areas of different illumination whereas an out-of-focus image tends to be made up of blurred areas. Since the semiconductor material is granular, the conductance change between individual grains is greatest when an image on the surface of the material is in focus, that is, mostly delineated. The least net conductance, for a given amount of incident light, is reached when the differences between conductance values between adjacent areas is the greatest. This occurs, of course, when the image is most sharply focused.

As the focal plane of an optical image is adjusted to approach the surface of the photoconductive cell from the left in the Figure, the cell conductance approaches a minimum. The minimum is reached when the focal plane falls upon the surface of the cell. As the adjustment continues to move the focal plane past and to the right of the cell surface, cell conductance increases.

As the enlarger focusing knob 11 is adjusted, a varying audible tone is emitted from a speaker 16 of a focusing device 17. The knob is adjusted until the frequency of the tone reaches a maximum or minimum value, as previously determined. At that point, the image from the enlarger 10 is exactly focused upon the surface of the image plate 12. The probe 14 is then removed and the usual enlarging process continued.

The enlarger is shown in FIG. 1 for purposes of illustration only, as this invention may be utilized with various types of optical devices. For example, the probe 14 may be inserted in a camera, film printer or other image-forming devices.

The focusing device 17 is shown with a meter 20 as an indicator in addition to the speaker 16. The meter 20 may be included in the device or deleted, as desired, as it forms no part of this invention.

Figure 2:
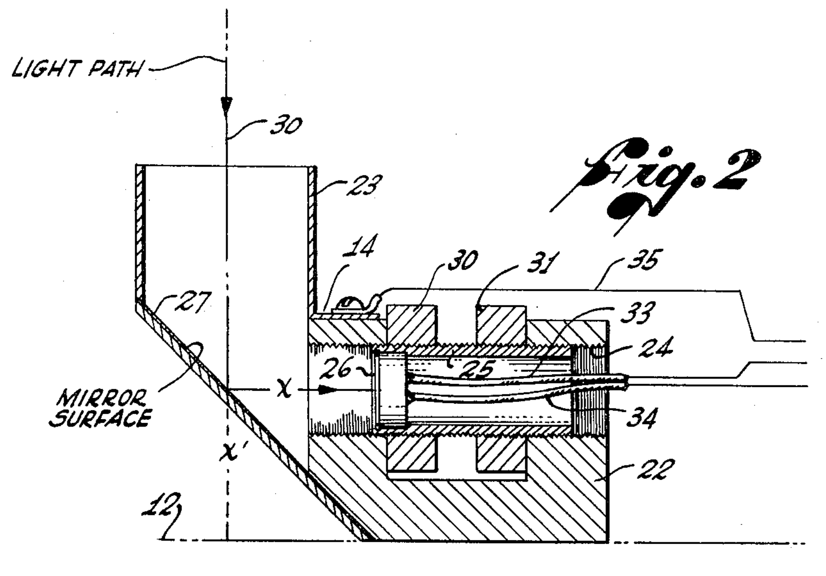
FIG. 2 is an enlarged fragmentary cross-section taken along the line 2—2 of FIG. 1, through the probe.

Details of one embodiment of the probe 14 are illustrated in FIG. 2. As explained above, it is only necessary that the probe 14 contain the photoconductive cell in such a fashion that the cell surface is the same distance from the image source as the surface on which the probe rests. While a number of different structures could be utilized, the preferred embodiment is shown in FIG. 2.

The probe 14 is formed of a generally U-shaped body 22 and a hollow receiver 23. The body 22 is threaded at an aperture 24 at one end to receive a threaded sleeve 25 which holds the photoconductive cell 26 at one end. The receiver 23 is provided with a mirror surface 27 placed at an angle of 45° with the horizontal. In use, a light path 30 is directed from the mirror 27 to the surface of the photoconductive cell 26.

The threaded sleeve 25 is adjusted, aided by a pair of locking nuts 30, 31, until the distance X from any point on the mirror 27 to the cell 26 is the same as the distance X' from the same point to the image surface 12. In this way, an image focused on the surface of the cell 26 will be focused on the surface of the image surface 12 when the probe 14 is removed.

Standard electrical leads connect the probe to the tone-generating circuitry. Cell conductance changes are sensed across a pair of leads 33, 34 while a common ground is established by a third lead 35.

Figure 3:
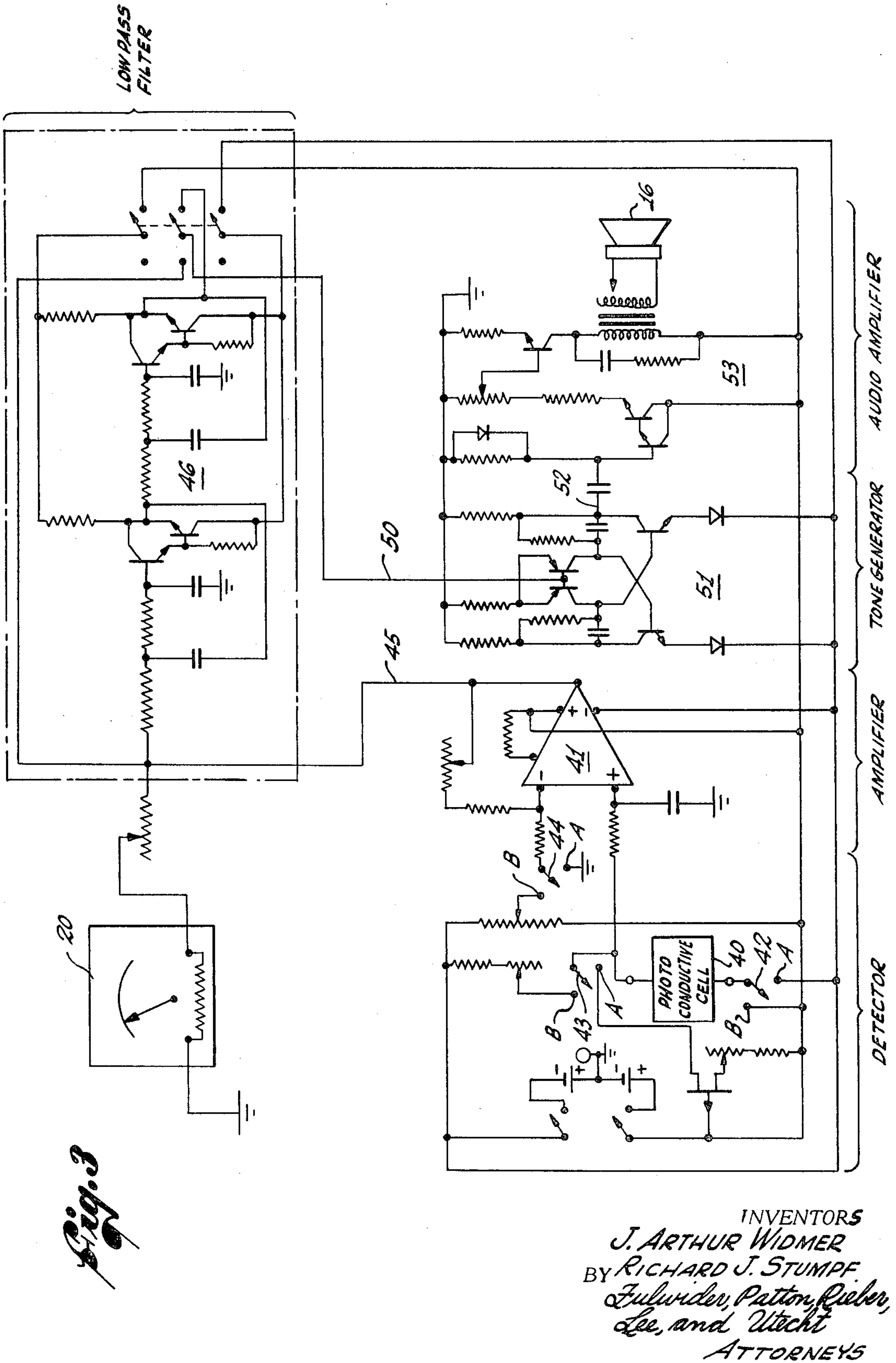
FIG. 3 is a schematic diagram of a representative electrical circuit for use in this invention.

Representative electrical circuitry for producing the audible tone as a function of the cell conductance is shown in FIG. 3. The photoconductive cell 40 is a standard, readily obtainable, cell of either cadmium sulfide, cadmium selenide or cadmium telluride.

One side of the photoconductive cell 40 is applied to a d.c. amplifier 41. As with the other circuit components herein, the amplifier 41 is of standard design and will not be described in detail. Any person skilled in the art could construct the various components of the circuit illustrated in FIG. 3 by referring only to this specification and to the drawings.

The opposite side of the cell 40 is connected to one pole 42 of a ganged three-pole switch 42, 43, 44. When the switch is in position A, the frequency of the output tone is at a minimum when the sharpest focus is reached. In position B, the frequency of the tone is at a maximum when the sharpest focus is reached. The position, and resultant tone, are selected by the user of the invention. The amplifier 41 develops a varying d.c. voltage on line 45 as a function of the conductance of cell 40.

It has been found that 60 Hertz or 120 Hertz interference is sometimes encountered in the use of this invention. For example, some pulsed light sources, such as high intensity xenon lamps, impose a low frequency component on the output of the amplifier 41. Since such audio frequency components would distort the output, the amplifier output 41 is supplied to a low-pass filter 46. The filter, of known design, removes the unwanted signal components. The filter output is supplied to the tone generator via line 50.

The tone generator 51 is a voltage controlled variable frequency multivibrator of known design. It generates, on an output lead 52, an audio signal of low power, the frequency of which is controlled by the d.c. level on line 50 and, therefore, the conductance of photoconductive cell 40.

The lead 52 couples the low power audio tone to the audio amplifier 53. Like the other circuit components, the audio amplifier 53 is of standard design. Its function is to increase the power level of the audio signal so that it may be made audible by speaker 16. The output of the amplifier 41 on the lead 45 can also be coupled to the meter 20, if desired.

It will be apparent from the foregoing that, while a particular form of the invention has been illustrated and described, various modifications can be made without departing from the spirit and scope of the invention.

We claim:

1. In a device for aiding the focusing of an optically formed image at a predetermined plane, the combination comprising photoconductive cell means for developing a first electrical signal value dependent upon the degree of focus of an optical image incident thereon, means for generating a second electrical signal varying with the value of said first electrical signal, and, means responsive to said second electrical signal generating means for producing an audible tone of a frequency related to said second electrical signal, whereby said audible tone varies in pitch according to the degree of focus of said optical image.

2. The focusing device of claim 1, wherein said photoconductive cell means comprises body means for placing upon a surface co-planar with said predetermined plane, and,
reflective means contained within said body means for directing light images incident upon said surface to said photoconductive cell.

3. The focusing device of claim 2, further comprising means for adjusting the relative position within said body means of said photoconductive cell and said reflective means.

4. The focusing device of claim 3,
wherein said body means includes a threaded aperture positioned along an axis parallel to said surface when said body means is placed thereon,
and, further comprising threaded means connected to said photoconductive cell for adjustably moving said cell in said threaded aperture.

5. The focusing device of claim 1, wherein said responsive means comprises
oscillator means for producing an alternating voltage in the audio range,
electrical amplifier means for increasing the power level of said alternating voltage,
and, speaker means connected to the output of said amplifier means for making said alternating voltage audible.

6. The focusing device of claim 5, wherein said oscillator means comprises a voltage controlled variable frequency multivibrator.

7. The focusing device of claim 1, wherein said means for generating a second electrical signal comprises
amplifier means for producing a d.c. voltage level as a function of said first electrical signal value,
and, filter means for removing from said d.c. voltage level any unwanted audio frequency voltage components.

8. The focusing device of claim 1, wherein
said means for developing a first electrical signal comprises body means for placing upon a surface co-planar with said predetermined plane for containing said photoconductive cell means, and,
reflective means contained within said body means for directing light images incident upon said surface to said photoconductive cell, and,
said responsive means comprises
oscillator means for producing an alternating voltage in the audio range,
electrical amplifier means for increasing the power level of said alternating voltage,
and, speaker means connected to the output of said amplifier means for making said alternating voltage audible.

9. The focusing device of claim 8, wherein said oscillator means comprises a voltage controlled variable frequency multivibrator.

10. In a device for aiding the focusing of an optically formed image, the combination comprising,
photoconductive cell means for developing an electrical conductance value dependent upon the degree of focus of an optical image incident thereon,
amplifier means for generating a d.c. voltage level dependent upon the value of said conductance,
oscillator means connected to receive the d.c. voltage level for producing an alternating voltage in the audio range of a frequency proportional to said level,
and, speaker means connected to the output of said oscillator means for making said alternating voltage audible, whereby said audible alternating voltage varies in pitch according to said electrical conductance value and said degree of focus.

11. In a device for aiding the focusing of an optically formed image at a predetermined plane, the combination comprising,
body means for placing upon a surface co-planar with said predetermined plane, said body means including a threaded aperture positioned along an axis parallel to said surface when said body means is placed thereon,
photoconductive cell means for developing an electrical conductance value as a function of the degree of focus of an optical image incident thereon,
threaded means connected to said photoconductive cell means for adjustably moving said cell in said threaded aperture,
reflective means connected to said body means for directing light images incident upon said surface to said photoconductive cell,
amplifier means for producing a d.c. voltage level dependent upon said value of electrical conductance,
filter means for removing from said d.c. voltage level any unwanted audio voltage components,
variable frequency multivibrator means connected to generate an alternating voltage in the audio range dependent upon said d.c. voltage level,
electrical amplifier means for increasing the power level of said alternating voltage,
and, speaker means connected to the output of said amplifier means for making said alternating voltage audible.

* * * * *